United States Patent Office 2,851,824
Patented Sept. 16, 1958

2,851,824

TREATMENT OF SOILS WITH ASPHALT

Joseph Addison Campbell, Hermosa Beach, Calif., assignor to X-Port Oils, Inc., Los Angeles, Calif., a corporation of California No Drawing. Application October 14, 1954
Serial No. 462,379

7 Claims. (Cl. 47—58)

This invention pertains to methods of stabilizing and improving soils and is also directed to particular materials which greatly improve the characteristics of soils.

The water retention characteristics of soils are of greatest importance in insuring productivity. An efficient soil of good characteristics should be of fine texture, be capable of absorbing moisture, retaining the moisture in a form available to plant life and still be sufficiently porous and open so as to permit penetration of surface moisture thereinto and the passage of air and gases into and out of the soil. A heavy clay will, of course, retain moisture very tenaciously but is not a good soil in that it does not permit the surface waters to penetrate the soil properly and is of such density as to prevent the passage of air and gases thereinto; heavy clay soils furthermore bake, crust and present an unworkable surface. Sandy soils, on the other hand, have excessive porosity and are incapable of retaining an adequate amount of available moisture.

Among criteria used in evaluating physical properties of soils, one may refer to bulk density, porosity, permeability, water-holding capacity at saturation, field capacity available moisture and rate of moisture loss. These properties appear to depend greatly upon the presence of granules and aggregates consisting of closely bound primary particles.

The present invention is directed to a method of treating soils for the purpose of increasing their water retention, forming small, loose aggregates of soil particles and stabilizing the soil so that it will not puddle in the presence of saturating water nor blow away under the influence of high winds. The method of the present invention results in the formation of agglomerates which induce the proper movement of water therethrough without excessive and rapid penetration, since such rapid penetration often results in leaching and the loss of valuable fertilizing matters. The method of the present invention agglomerates the suspended clay particles in the form of granules, thus opening pores in the soil and enabling the free circulation of water and the admission and action of gases and sunlight.

Moreover, the method of the present invention employs readily available, very inexpensive materials and may be readily combined with normal soil-tilling operations, such as plowing, discing, harrowing and the like. Special equipment is unnecessary.

Generally stated, the method of the present invention comprises applying a fine spray of an aqueous dispersion containing asphalt having hydrophilic or wetting characteristics, the quantity of asphalt thus supplied being insufficient to cause the formation of a continuous film on the surface of the soil but sufficient to form small soil aggregates when the asphalt thus applied is mixed with say, the upper 3 to 6 inches of soil. This treatment results in the formation of small soil aggregates, whereby the excessive permeability of sandy soils is reduced and the permeability of clay soils (such as adobe) is increased. The water retention of sandy soils is enhanced and moisture is therefore permitted to remain within an active zone in which it is available to plant life for a longer period of time. The field capacity and available moisture is increased and the bulk density is reduced. As a result, irrigation need not be as frequent, thereby materially reducing labor costs. In the Pacific Coast and Southwest States, which use irrigation extensively and where water tables are dropping alarmingly, the present invention permits available water to be used to best advantage.

It is an object of the present invention, therefore, to disclose and provide methods and materials whereby soils may be stabilized and benefited in an economical and facile manner.

Another object of the invention is to disclose and provide methods and materials whereby colloidal constituents of soils may be agglomerated into the form of small granules or aggregates, with concomitant increase of the porosity of the soil and its ability to retain available moisture.

A still further object of the invention is to disclose and provide a method which employs asphalt in the form of a substantially colloidal dispersion or suspension, such asphalt having hydrophilic, soil-wetting properties capable of causing agglomeration and stabilization of soils.

These and various other objects, advantages and adaptations of the invention will become apparent to those skilled in the art from the following description.

The active material contemplated by this invention for the novel uses herein stated is asphalt, either natural or preferably asphalt resulting from petroleum refining operations. Ordinary asphalt, however, does not have hydrophilic, soil-wetting characteristics to any marked extent and therefore asphalt particularly adapted for use in the methods herein disclosed contains suitable wetting agents. Such wetting agents may be additives, purposely added to the asphalt prior to the production of the aqueous suspensions or dispersions employed, or the desired hydrophilic characteristics may be developed within the asphalt by suitable treatment of its naturally contained components. Pyrogenous asphalts (including residues obtained from the distillation, cracking, blowing, etc. of petroleums and embracing residual oil, residual asphalts, sludge asphalt, pressure tar, etc.) contain acidic constituents, such as sulfonic acids, which may be suitably neutralized and converted into soaplike compounds to thereby impart wetting characteristics to the asphalt and incidentally, facilitating the dispersion of the asphalt in an aqueous medium (see Patents No. 1,643,675, No. 1,981,522, No. 2,083,498 and No. 2,083,499, etc.). Although such treatments are beneficial and increase the effectiveness of asphalt for the purposes of this invention, the treatment does not impart permanently hydrophilic, soil-wetting characteristics to the asphalt. In accordance with the invention, the asphalt is preferably treated with amine soaps; by reacting dry ammonia amines, diamines, triamines or tetramines with asphalt at sufficiently elevated temperatures, amine compounds are formed by combination with naturally occurring acidic constituents which impart unusual characteristics to the asphalt, permitting such asphalt to thoroughly and virtually permanently wet siliceous soil particles, sand and the like. Any pyrogenous asphalts may be partly neutralized with an inexpensive alkaline material such as lime, and then reacted with an amine such as hexamethylenetetramine at a temperature on the order of 400° F.–500° F. for a period of one-half to one and one-half hours, the resulting asphalt having exceptionally stable hydrophilic characteristics.

The hydrophilic asphalts hereinabove described are dispersed or suspended in an aqueous medium and, in accordance with the method of this invention, a dilute suspension or dispersion of such asphalt is applied in the form of a fine spray to the soil to be treated. The aqueous suspensions or dispersions may contain from about 1% to 10% by weight of asphalt. These fine sprays are preferably applied to the soil during or immediately after tilling; for example, the ground can be plowed or disced and sprayed immediately after such operation and the soil again tilled as by discing or harrowing in order to disperse the minute asphaltic particles to an effective depth of soil, say to a depth of three to six inches. It is to be understood that the amount of asphalt thus applied should be insufficient to form a continuous film on the surface of the soil. Highly developed hydrophilic characteristics of the asphalt are desirable inasmuch as water is used as the carrier or dispersing agent and ordinary asphalt will not adhere to or cause agglomeration of siliceous or argillaceous particles in the presence of water. The amount of asphalt thus applied to the soil will, of course, vary with the characteristics of the soil, but in general, from 400 to 1800 lbs. of asphalt per acre is adequate to produce material improvement in porosity, water-retaining characteristics, etc.

Treatment of soils in accordance with the present invention increases the moisture content at saturation, in some soils, from a normal of about 26–30% to as much as 45–48%. The treatment increases field capacity from a normal low of, say 20%, to a capacity on the order of 30%–35%, so that with a wilting point at about 10% moisture content, the available moisture is increased by the method of this invention from about 10% to as high as 25%. Moreover, bulk density is reduced from, say 1.4 to 1.1 and porosity increased from 0.4–0.45 to 0.50–0.58 in sandy soils. In dense, highly impermeable soils, such as adobe, permeability is increased from, say 0.15 inch per hour to between about 0.25 and 0.35 inch per hour.

The method of the present invention not only permits the conversion and stabilization of soils but may also be employed in concomitantly introducing soil fumigants and soil-soluble poisons into the soil. Instead of fumigating the soil as a separate step (such as the fumigation steps employed against nematodes and wire worms) water-soluble, non-volatile poisons, such as salts of mercury, arsenates, etc. and organic poisons such as dithiobiuret and its derivatives, lactonitrile and its derivatives, etc., can be added to the aqueous medium in which the asphalt is dispersed and added directly to the soil at the time that the asphalt is applied. The use of expensive fumigation equipment and the time consumed in such separate treatment is thus obviated.

It is to be understood that the term "asphalt" as used herein and in the claims appended hereto includes residual oils and other residues embraced by the specification.

All changes, modifications and adaptations coming within the scope of the appended claims are embraced thereby.

I claim:

1. A method of conditioning soils to increase their porosity and ability to retain moisture which comprises: applying to soil a fine spray of an aqueous dispersion containing from about 1% to 10% by weight of asphalt having hydrophilic characteristics, said spray being applied in quantity insufficient to form a continuous film of asphalt on the surface of the soil, and forming small aggregates of soil by tilling the soil to distribute the asphalt throughout the upper portion thereof.

2. A method of the character stated in claim 1, wherein the aqueous dispersion contains a water-soluble soil fumigant.

3. A method as stated in claim 1 wherein the spray is applied in quantity sufficient to supply between 400 lbs. and 1800 lbs. of asphalt per acre.

4. A method as stated in claim 1, wherein said asphalt is the product of reacting a pyrogenous asphaltic material with a dry amine at a temperature of between about 400° F. and 500° F.

5. A method of conditioning soils to increase their porosity and ability to retain moisture which comprises: tilling the soil and simultaneously spraying the soil with a dilute aqueous dispersion of asphalt having hydrophilic characteristics, the quantity of asphalt thus applied being insufficient to cause a continuous film on the surface of the soil but sufficient to form small soil aggregates within the upper three to six inches of soil by said simultaneous tilling.

6. A method of conditioning soils to increase their porosity and ability to retain moisture which comprises: applying to soil a fine spray of an aqueous dispersion containing from about 1% to 10% by weight of asphalt having hydrophilic characteristics, said spray being applied in a quantity within the range from about 400 pounds to 1800 pounds per acre of soil, said quantity being insufficient to form a continuous film of asphalt on the surface of the soil, and forming small aggregates of soil by tilling the soil to distribute the asphalt through the upper portion thereof.

7. As a soil-treating agent adapted to increasing the porosity and ability to retain moisture of soils: an aqueous medium containing a suspension of asphalt having hydrophilic characteristics, said asphalt being produced by the reaction of a pyrogenous asphaltic material with a dry amine at a temperature on the order of 400° F. to 500° F., said suspension being characterized by an ability to form small soil aggregates when intermixed with the soil.

References Cited in the file of this patent

UNITED STATES PATENTS

| | | |
|---|---|---|
| 1,988,175 | Merrill | Jan. 15, 1935 |
| 2,333,959 | Smith | Nov. 9, 1943 |
| 2,396,669 | Auer | Mar. 19, 1946 |
| 2,414,640 | Fischer | Jan. 21, 1947 |

FOREIGN PATENTS

| | | |
|---|---|---|
| 368,438 | Italy | Feb. 15, 1939 |

OTHER REFERENCES

"Asphalts and Allied Substances" (Abraham), published by Van Nostrand (N. Y.), 1945, fifth edition, vol. 1, pages 552 through 565.

"Asphalts and Allied Substances" (Abraham), published by Van Nostrand (N. Y.), 1945, fifth edition, vol. 2, page 1667.

Lentz: "How to Grow Grass on Roadsides," published April 1949 in Public Works (magazine), vol. 80, No. 4, pages 30, 31, 32.

Gabriel: "Some Cold Bituminous Constructions," published July 9, 1949, at London, England, in Chemistry and Industry (magazine), pages 495 through 499.

H. M. Smith: "The Effect of Asphalt Mulches on the Stabilization of Soils and Aggregate Materials and on Vegetational Cover," published before August 19, 1953, as an Abstract of a Thesis at University of Illinois, Urbana, Illinois, eight pages.

Naval Stores Review, vol. 63, No. 19, pages 16, 17, 25, 26, 27 (August 22, 1953), article "Tall Oil in Asphalt Products."